(12) United States Patent
Sajassi

(10) Patent No.: US 9,088,669 B2
(45) Date of Patent: Jul. 21, 2015

(54) SCALABLE SYSTEM AND METHOD FOR DSL SUBSCRIBER TRAFFIC OVER AN ETHERNET NETWORK

(75) Inventor: Ali Sajassi, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

(21) Appl. No.: 11/117,249

(22) Filed: Apr. 28, 2005

(65) Prior Publication Data

US 2006/0245435 A1   Nov. 2, 2006

(51) Int. Cl.
*H04L 12/28*   (2006.01)
*H04M 11/06*   (2006.01)
*H04L 12/46*   (2006.01)
*H04L 29/12*   (2006.01)

(52) U.S. Cl.
CPC ......... *H04M 11/062* (2013.01); *H04L 12/2881* (2013.01); *H04L 12/4662* (2013.01); *H04L 29/12839* (2013.01); *H04L 61/6022* (2013.01)

(58) Field of Classification Search
None
See application file for complete search history.

(56) References Cited

U.S. PATENT DOCUMENTS

| | | | |
|---|---|---|---|
| 5,331,637 A | 7/1994 | Francis et al. | |
| 5,818,842 A | 10/1998 | Burwell et al. | |
| 5,848,227 A | 12/1998 | Sheu | |
| 6,055,364 A | 4/2000 | Speakman et al. | |
| 6,073,176 A | 6/2000 | Baindur et al. | |
| 6,078,590 A | 6/2000 | Farinacci et al. | |
| 6,188,694 B1 | 2/2001 | Fine et al. | |
| 6,301,244 B1 | 10/2001 | Huang et al. | |
| 6,304,575 B1 | 10/2001 | Carroll et al. | |
| 6,308,282 B1 | 10/2001 | Huang | |
| 6,373,838 B1 | 4/2002 | Law et al. | |
| 6,424,657 B1 | 7/2002 | Voit et al. | |
| 6,430,621 B1 | 8/2002 | Srikanth et al. | |
| 6,470,025 B1 | 10/2002 | Wilson et al. | |

(Continued)

FOREIGN PATENT DOCUMENTS

| WO | WO 03/005648 | 1/2003 |
|---|---|---|
| WO | WO 2005/034441 | 4/2005 |
| WO | WO 2008/089370 | 7/2008 |

OTHER PUBLICATIONS

Cohen et al., "Migration to Ethernet Based DSL Aggregation", DSL Forum, WT-101, Rev. 6, p. 1-49, Feb. 2005.*
Lahti "Quality of Service in the Poin-to-Point Protocol over Ethernet" in: Google Scholar (on line, <URL:http://www.e.kth.se/~e95_pla/exjobb/doc/Lahti_Thesis_QoS_in_PPPoE.pdf>) Oct. 1, 2000.

(Continued)

*Primary Examiner* — Timothy J Weidner
(74) *Attorney, Agent, or Firm* — Baker Botts L.L.P.

(57) ABSTRACT

A system and method for identifying and forwarding traffic to/from Digital Subscriber Line Access Multiplexer (DSLAM) devices and feature servers without ambiguity includes a user-facing provider edge (u-PE) device that receives a customer frame from a DSLAM device, the customer frame being of a first format that includes a first Virtual Local Area Network (VLAN) tag of a first bit length. The first VLAN tag identifies a Digital Subscriber Line (DSL) subscriber. The customer frame is re-formatted by the u-PE device such that the first VLAN tag is mapped to a second VLAN tag of a second bit length greater than the first bit length, the second VLAN tag identifying a service instance of the Ethernet access network. The u-PE device encapsulating the customer frame inside a provider frame, with a provider source Media Access Control (MAC) address represents a MAC address associated with the DSLAM, and a provider destination MAC address represents a MAC address of a destination device.

15 Claims, 5 Drawing Sheets

(56) References Cited

U.S. PATENT DOCUMENTS

| | | |
|---|---|---|
| 6,484,209 B1 | 11/2002 | Momirov |
| 6,502,140 B1 | 12/2002 | Boivie |
| 6,519,231 B1 | 2/2003 | Ding et al. |
| 6,611,869 B1 | 8/2003 | Eschelbeck et al. |
| 6,665,273 B1 | 12/2003 | Goguen et al. |
| 6,667,982 B2 | 12/2003 | Christie et al. |
| 6,668,282 B1 | 12/2003 | Booth, III et al. |
| 6,693,878 B1 | 2/2004 | Daruwalla et al. |
| 6,732,189 B1 | 5/2004 | Novaes |
| 6,757,286 B1 | 6/2004 | Stone |
| 6,763,469 B1 | 7/2004 | Daniely |
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,879,594 B1 | 4/2005 | Lee et al. |
| 6,882,643 B1 | 4/2005 | Mauger et al. |
| 6,892,309 B2 | 5/2005 | Richmond et al. |
| 6,954,436 B1 | 10/2005 | Yip |
| 7,009,983 B2 | 3/2006 | Mancour |
| 7,016,351 B1 | 3/2006 | Farinacci et al. |
| 7,047,304 B2 | 5/2006 | Senapati et al. |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,315,554 B2 | 1/2008 | Baum et al. |
| 7,339,929 B2 | 3/2008 | Zelig et al. |
| 7,345,991 B1 | 3/2008 | Shabtay et al. |
| 7,408,936 B2 | 8/2008 | Ge et al. |
| 7,466,703 B1 | 12/2008 | Arunachalam et al. |
| 7,519,056 B2 * | 4/2009 | Ishwar et al. ............... 370/389 |
| 7,529,254 B2 * | 5/2009 | Tsuge et al. ............... 370/401 |
| 7,606,218 B2 * | 10/2009 | White et al. ............... 370/352 |
| 7,609,637 B2 * | 10/2009 | Doshi et al. ............... 370/235 |
| 7,633,956 B1 * | 12/2009 | Parandekar et al. ......... 370/401 |
| 7,639,696 B2 * | 12/2009 | Wu ........................... 370/395.53 |
| 7,693,078 B2 | 4/2010 | Gonda |
| 7,698,456 B2 | 4/2010 | Guichard et al. |
| 7,701,936 B2 | 4/2010 | Hongal et al. |
| 7,843,917 B2 | 11/2010 | Brockners |
| 8,165,156 B1 * | 4/2012 | Melsen ...................... 370/466 |
| 2002/0024964 A1 * | 2/2002 | Baum et al. ............... 370/419 |
| 2002/0032780 A1 | 3/2002 | Moore et al. |
| 2002/0087721 A1 | 7/2002 | Sato et al. |
| 2002/0156612 A1 | 10/2002 | Schulter et al. |
| 2002/0156919 A1 | 10/2002 | Maeno |
| 2002/0196795 A1 | 12/2002 | Higashiyama |
| 2003/0012183 A1 | 1/2003 | Butler |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 * | 8/2003 | Lamberton et al. ............ 709/213 |
| 2003/0177221 A1 | 9/2003 | Ould-Brahim et al. |
| 2004/0044789 A1 * | 3/2004 | Angel et al. ............... 709/238 |
| 2004/0078469 A1 * | 4/2004 | Ishwar et al. ............... 709/227 |
| 2004/0081171 A1 | 4/2004 | Finn |
| 2004/0095940 A1 | 5/2004 | Yuan et al. |
| 2004/0102182 A1 | 5/2004 | Reith et al. |
| 2004/0107382 A1 | 6/2004 | Doverspike et al. |
| 2004/0125809 A1 | 7/2004 | Jeng |
| 2004/0133619 A1 | 7/2004 | Zelig et al. |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0213201 A1 | 10/2004 | Osterlund |
| 2004/0228291 A1 | 11/2004 | Huslak et al. |
| 2004/0230444 A1 | 11/2004 | Holt et al. |
| 2004/0233891 A1 | 11/2004 | Regan |
| 2004/0264364 A1 | 12/2004 | Sato |
| 2005/0007951 A1 | 1/2005 | Lapuh et al. |
| 2005/0025143 A1 * | 2/2005 | Chen et al. .................... 370/389 |
| 2005/0030975 A1 | 2/2005 | Wright et al. |
| 2005/0044265 A1 | 2/2005 | Vinel et al. |
| 2005/0063397 A1 | 3/2005 | Wu et al. |
| 2005/0068972 A1 | 3/2005 | Burns et al. |
| 2005/0089047 A1 | 4/2005 | Ould-Brahim et al. |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157751 A1 | 7/2005 | Rabie et al. |
| 2005/0160180 A1 | 7/2005 | Rabje et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0193385 A1 | 9/2005 | Heer et al. |
| 2005/0239445 A1 | 10/2005 | Karaoguz et al. |
| 2005/0249124 A1 | 11/2005 | Elie-Dit-Cosaque et al. |
| 2005/0265329 A1 | 12/2005 | Havala et al. |
| 2005/0286503 A1 | 12/2005 | Oda et al. |
| 2006/0007867 A1 | 1/2006 | Elie-Dit-Cosaque et al. |
| 2006/0092847 A1 | 5/2006 | Mohan et al. |
| 2006/0098607 A1 | 5/2006 | Zeng |
| 2006/0109802 A1 | 5/2006 | Zelig et al. |
| 2006/0126496 A1 | 6/2006 | Filsfils et al. |
| 2006/0159008 A1 * | 7/2006 | Sridhar et al. ............... 370/216 |
| 2006/0168270 A1 * | 7/2006 | Townsley et al. ............. 709/230 |
| 2006/0182037 A1 | 8/2006 | Chen et al. |
| 2006/0198323 A1 | 9/2006 | Finn |
| 2006/0248227 A1 | 11/2006 | Hato |
| 2006/0248277 A1 | 11/2006 | Pande |
| 2006/0262794 A1 | 11/2006 | Livet et al. |
| 2006/0285500 A1 | 12/2006 | Booth |
| 2006/0285501 A1 | 12/2006 | Damm |
| 2007/0076719 A1 | 4/2007 | Allan et al. |
| 2007/0133564 A1 | 6/2007 | Chun et al. |
| 2007/0274321 A1 | 11/2007 | Jonsson et al. |
| 2008/0062999 A1 | 3/2008 | Platnic |
| 2008/0144657 A1 | 6/2008 | Li |
| 2008/0172497 A1 | 7/2008 | Mohan et al. |
| 2009/0019469 A1 | 1/2009 | Foti et al. |
| 2009/0129386 A1 | 5/2009 | Rune |
| 2009/0154466 A1 * | 6/2009 | Townsley et al. ........... 370/395.1 |
| 2010/0142526 A1 * | 6/2010 | Wong ........................... 370/389 |

OTHER PUBLICATIONS

Light Reading, Inc., Distributed-Edge Artecture, Nov. 25, 2003.
Landron, Use of the IEEE Assigned Type Field with IEEE std 802.3, 1998 Edition Local and Metropolitan Area Networks, Apr. 16, 2004.
Marc Lasserre et al., "Virtual Private LAN Services over MPLS", Mar. 2003, Internet Draft Document, pp. 4-22.
Supplementary European Search Report; European Patent Office; Ref: P30915EP-PCT/IK; Appl. No. 06748790.0-1853/1875668; PCT/US2006011224; dated Dec. 9, 2014.
Bouchat, et al; QoS in DSL Access; Topics in Broadband Access; IEEE Communications Magazine; Sep. 2003.
Wolfe, [dhcwg] Publication of draft-droms-agentopt-8021x-00.txt, Nov. 22, 2001, IETF.
Cisco, Delivering Multicast Video over Asymmetric Digital Subscriber Line, 1999, Cisco.
Flannagan et al., Cisco Catalyst QoS; Quality of Service in Campus Networks, Jun. 6, 2003, Cisco Press, chapter 8, section 4.
Chiruvolu et al., "Issues and Approaches on Extending Ethernet Beyond LANs", Ieee Communications Magazine, Mar. 2004, p. 80-86.

\* cited by examiner

SCALABLE SYSTEM AND METHOD FOR DSL SUBSCRIBER TRAFFIC OVER AN ETHERNET NETWORK

RELATED APPLICATIONS

The present application is related to co-pending application Ser. No. 11/117,016 filed Apr. 28, 2005, entitled, "Metro Ethernet Network With Scaled Broadcast And Service Instance Domains"; Ser. No. 11/117,250 filed Apr. 28, 2005, entitled, "A Comprehensive Model For VPLS"; and Ser. No. 11/117,017 filed Apr. 28, 2005, entitled, "System And Method For DSL Subscriber Identification Over Ethernet Network", which applications are assigned to the assignee of the present application.

FIELD OF THE INVENTION

The present invention relates generally to data communications systems; more specifically, to subscriber access and communications over a high-speed network.

BACKGROUND OF THE INVENTION

Digital Subscriber Line (DSL) technology is widely-used today for increasing the bandwidth of digital data transmissions over the existing telephone network infrastructure. In a typical system configuration, a plurality of DSL subscribers are connected to a service provider (SP) network through a Digital Subscriber Line Access Multiplexer (DSLAM), which concentrates and multiplexes signals at the telephone service provider location to the broader wide area network. Basically, a DSLAM takes connections from many customers or subscribers and aggregates them onto a single, high-capacity connection. The DSLAM may also provide additional functions such as routing or Internet Protocol (IP) address assignment for the subscribers.

Asynchronous Transfer Mode (ATM) protocol networks have traditionally been utilized for communications between DSLAM devices and web feature servers such as Broadband Remote Access Servers (BRAS) and Layer 3 Virtual Private Network (L3VPN) servers. A BRAS is a device that terminates remote users at the corporate network or Internet users at the Internet service provider (ISP) network, and commonly provides firewall, authentication, and routing services for remote users. The ATM protocol is an international standard in which multiple service types (such as voice, video, or data) are conveyed in fixed-length "cells" over point-to-point network connections. ATM networks need a virtual circuit (VC) to be set up across the network before data transfer may occur. That is, communication between a subscriber and a feature server requires allocation of a separate VC. Data packet cells travel through the ATM switches from the user network interface (UNI) to the network node interface (NNI) through a process called Virtual Path Identifier/Virtual Channel Identifier (VPI/VCI) translation. The VPI/VCI identifiers are used by the ATM switches to switch/direct the subscriber traffic to a given feature server, and in the reverse direction to forward server traffic to a given DSLAM/subscriber, without ambiguity. Furthermore, the VPI/VCI mechanism is used by the feature server to identify the subscriber. By way of background, U.S. Pat. No. 6,801,533 teaches a system and method for proxy signaling in a DSLAM and generally describes a DSL network that includes communication transfer of signals from a DSLAM to a remote access server over a high-speed ATM network. Transmission of packet data over an ATM network is also taught in U.S. Pat. No. 6,785,232.

Ethernet is a technology that originated based on the idea of peers on a network sending messages in what was essentially a common wire or channel. Each peer has a globally unique key, known as the Media Access Control (MAC) address to ensure that all systems in an Ethernet have distinct addresses. Most modern Ethernet installations use Ethernet switches (also referred to as "bridges") to implement an Ethernet "cloud" or "island" that provides connectivity to the attached devices. The switch functions as an intelligent data traffic forwarder in which frames are sent to ports where the destination device is attached. Examples of network switches for use in Ethernet network environments are found in U.S. Pat. Nos. 6,850,542, 6,813,268 and 6,850,521.

As the use of Ethernet has become more widespread, researchers and service providers have developed a variety of methods and systems for data transmission using Ethernet technology. For example, U.S. Pat. No. 6,829,252 teaches a DSLAM device that incorporates a means of transporting Ethernet frame data over a very high-speed DSL (VDSL) transport facility. According to this approach, Ethernet frames are encapsulated within High-Level Data Link Control (HDLC) protocol formatted VDSL frames, which are then transmitted over a plurality of point-to-point links to customer sites. Ethernet-based DSL methods and systems are also described in U.S. Pat. No. 6,785,265.

The proliferation of Ethernet has also led service providers to seek ways of using Ethernet access network technology instead of ATM network technology to connect and aggregate DSLAM traffic to BRAS and other feature servers. However, achieving the three basic requirements of: (1) directing subscriber traffic to a given feature server depending on the requested service; (2) identifying the subscriber at the feature server; and (3) directing feature server traffic to a given subscriber in the reverse direction—all without any ambiguity—has proven difficult.

According to one proposal, Dynamic Host Configuration Protocol (DHCP) relay agents or Point-to-Point over Ethernet (PPPoE) intermediate agents are incorporated into the network edge device, e.g., the DSLAM or Ethernet access switch. (PPPoE is a specification for connecting Ethernet users to the Internet through a common broadband medium such as a DSL.) In this approach, the Ethernet edge device provides the DHCP server or Remote Authentication Dial-In User Service/Authentication, Authorization and Accounting (RADIUS/AAA) server with the same information it would normally receive from a BRAS DHCP relay agent or from a BRAS RADIUS client function in an ATM network. Although this proposal solves the problem of identifying the subscriber at the feature server, it fails to satisfy the other two requirements listed above.

In another proposal, the edge device translates the source MAC address of the subscriber packets into a new MAC address encoded with a DSLAM ID and line ID. This translation is performed such that the resultant MAC address is unique within the service provider network. When the packet is received by the feature server, the subscriber ID is extracted from the source MAC address. This proposal, however, suffers from several drawbacks that include limited DSLAM ID and port ID space, problems with reverse mapping of the provider MAC address to a subscriber MAC address, and security issues. Additionally, this approach is inadequate for multipoint applications where a separate broadcast domain (e.g., separate VLAN) is needed per service instance.

Thus, what is a needed is an alternative system and method for data communications between DSLAM devices and feature servers over an Ethernet network that overcomes the shortcomings of past approaches.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

An extended VLAN (E-VLAN) mechanism for identification and forwarding of traffic to/from DSLAMs and feature servers without ambiguity over an Ethernet network is described. In the following description specific details are set forth, such as device types, protocols, configurations, etc., in order to provide a thorough understanding of the present invention. However, persons having ordinary skill in the networking arts will appreciate that these specific details may not be needed to practice the present invention.

A computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Figure 5:
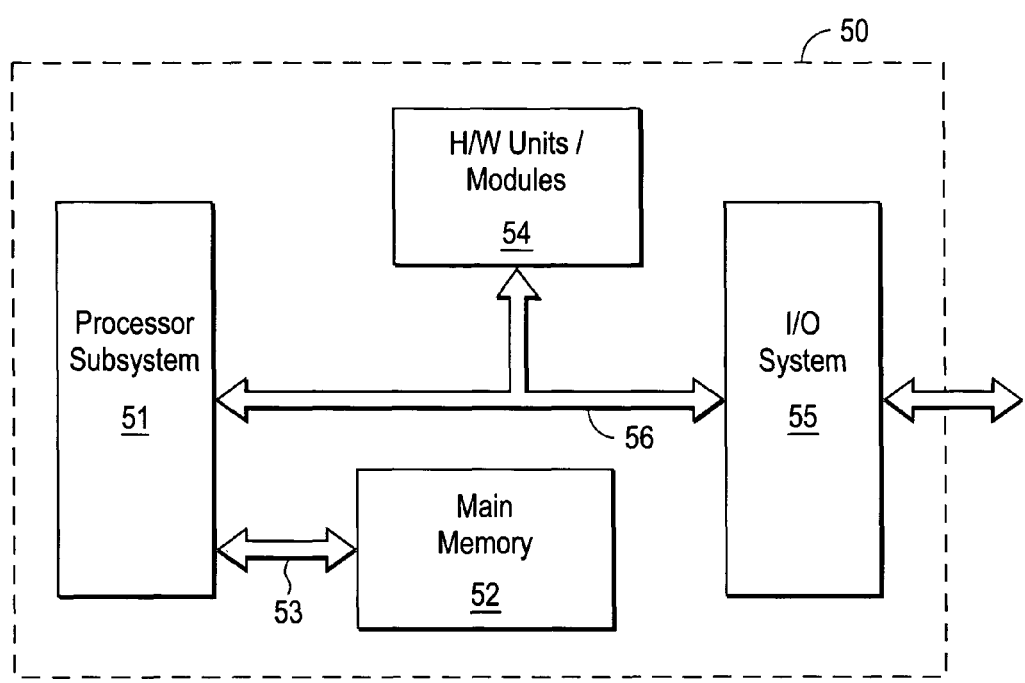
FIG. 5 is a generalized circuit schematic block diagram of a network node.

As shown in FIG. 5, each node 50 typically comprises a number of basic subsystems including a processor subsystem 51, a main memory 52 and an input/output (I/O) subsystem 55. Data is transferred between main memory ("system memory") 52 and processor subsystem 51 over a memory bus 53, and between the processor and I/O subsystems over a system bus 56. Examples of the system bus may include the conventional lightning data transport (or hyper transport) bus and the conventional peripheral component [computer] interconnect (PCI) bus. Node 50 may also comprise other hardware units/modules 54 coupled to system bus 56 for performing additional functions. Processor subsystem 51 may comprise one or more processors and a controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

Figure 1:
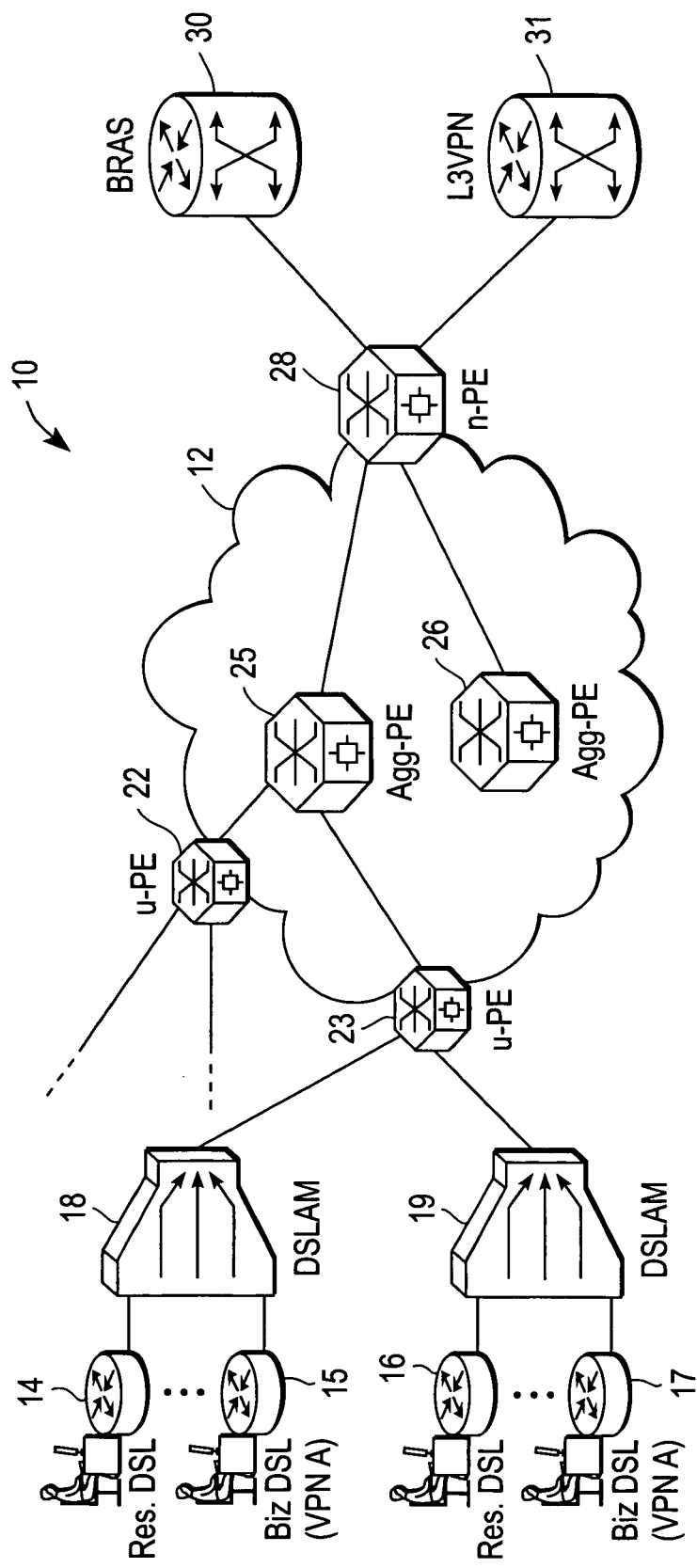
FIG. 1 is a diagram showing a network topology according to one embodiment of the present invention.

FIG. 1 is a diagram showing a DSLAM access/aggregation network topology 10, which includes and Ethernet access network 12 with user-facing provider edge (u-PE) devices 22 & 23 connected to a network-facing provider edge (n-PE) device 28 through one or more bridges or switches 25 & 26, also frequently referred to as provider edge aggregation (Agg-PE) devices. (In the context of the present application, the terms "bridge" and "switch" are considered synonymous.) The left-hand side of FIG. 1 shows a plurality of DSLAMs (e.g., devices 18 & 19) coupled to u-PE device 23. Each DSLAM aggregates a plurality of customers or subscribers. For example, customer edge (CE) devices 14 & 15 (respectively representing residential DSL subscriber 14 and business DSL subscriber 15) are shown connected to the input ports of DSLAM 18. Similarly, customer edge (CE) devices 16 & 17 are shown connected to DSLAM 19. On the right-hand side of FIG. 1 n-PE device 28 is shown connected to a plurality of service nodes, which include BRAS server 30 and L3VPN server 31.

Figure 2:
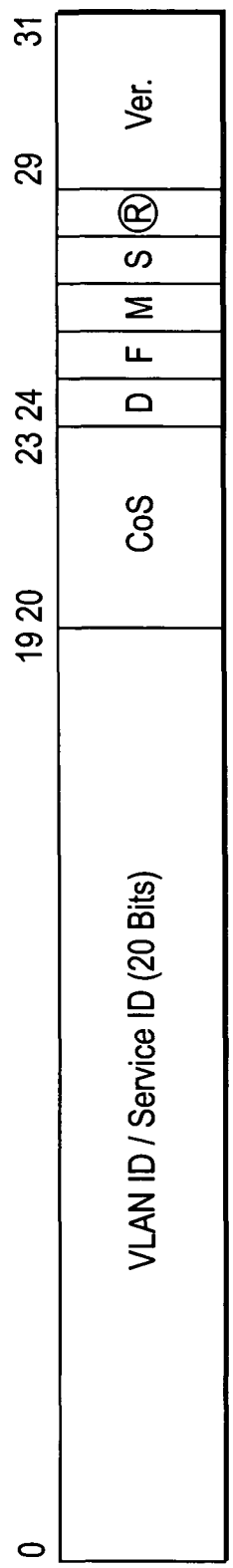
FIG. 2 shows one embodiment of the extended VLAN format of the present invention.

FIG. 2 shows the E-VLAN tag format in accordance with one embodiment of the present invention. An Ethertype associated with the E-VLAN may be used to identify this extended tag in an Ethernet frame. A key feature of the E-VLAN tag format is a 20-bit VLAN ID/Service ID field that allows identification, in certain applications, of up to one million different service instances. Also included is a 4-bit Class of Service (CoS) field, a Discard eligible (D) bit, a Frame Check Sequence-FCS (F) bit, a customer MAC address encapsulation (M) bit, and a stack (S) bit that indicates that VLAN stacking is utilized in the data packet format. Setting of the F bit indicates the customer FCS is retained and encapsulated in the Ethernet frame. Setting of the M bit indicates the entire customer frame, including the customer's MAC address, is encapsulated in the Ethernet frame. In cases where the M bit is set, the provider MAC address is used for tunneling through the SP network. These latter two features will be discussed in more detail below.

According to the present invention, the E-VLAN tag mechanism is utilized to meet network scalability requirements, and to identify each DSL subscriber and its associated service instance. Furthermore, either the E-VLAN tag itself or an outer VLAN (either a 12-bit IEEE 802.1q tag or a 20-bit E-VLAN tag) may be used to specify a separate broadcast domain per service instance for multipoint applications. In the former case, the E-VLAN tag serves as both service instance identifier and broadcast domain identifier. As practitioners in the networking arts understand, the IEEE 802.1q specification defines a standard for inserting Virtual Local Area Network (VLAN) tag information into Ethernet frames. Broadcast and multicast frames are constrained by VLAN boundaries such that only devices whose ports are members of the same VLAN see those frames. Since 802.1q VLANs typically span many switches across wide area network (WAN) links, support of VLANs over a common set of infrastructure switches is achieved by inserting a tag into the Ethernet frame. For example, according to the existing standard, a 12-bit tag that uniquely identifies a VLAN may be inserted into an Ethernet frame. This VLAN tag may be used to specify the broadcast domain and to identify the customer associated with a particular VLAN. The customer identifier is commonly referred to as the service instance domain since it identifies the service provided for a particular customer. In a service provider (SP) Ethernet network, the broadcast domain constrains the scope of traffic among network devices such that data packets are not multicast to all devices connected to the network.

As will become apparent shortly, the E-VLAN tag mechanism of the present invention also allows for tunneling of customer MAC addresses by encapsulating the entire customer Ethernet frame inside of the service provider's frame; identification of each customer through the use of service instance identifier field in the forwarded frame; specification of different broadcast domains (per customer, per service, etc.) through the use of a VLAN-id field of the frame; identification of the source entity in the provider's network through the use of the provider's source MAC address; and identification of the destination entity (e.g., feature server) in the provider's network through the use of the provider's destination MAC address. In various embodiments, the E-VLAN formatting may be performed at the DSLAM, or at the edge device (e.g., a node, switch or router) of an Ethernet access network connected to the DSLAM.

Figure 3:
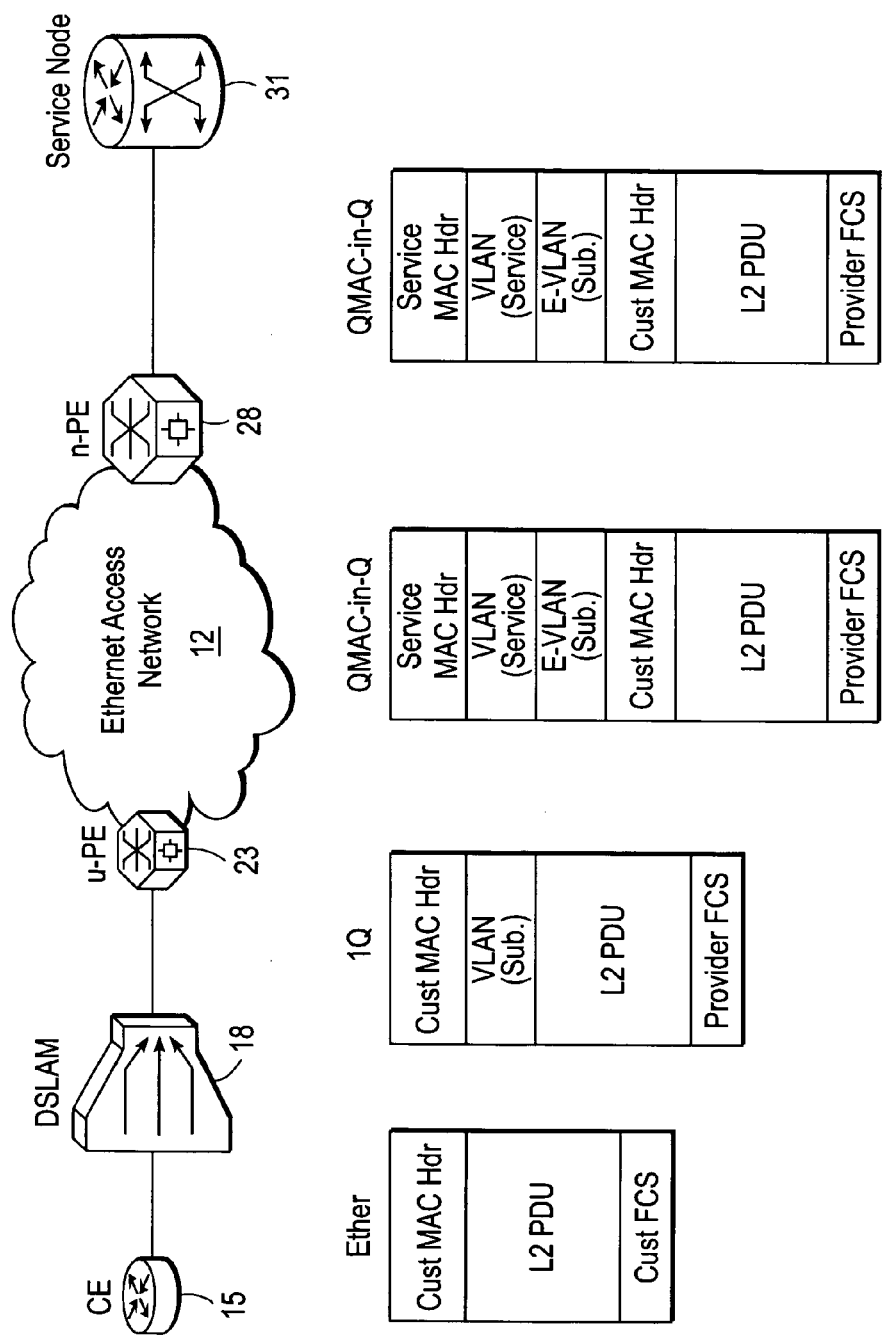
FIG. 3 illustrates the use of the extended VLAN mechanism for forwarding traffic over and Ethernet network in accordance with one embodiment of the present invention.

FIG. 3 illustrates an exemplary network configuration in accordance with one embodiment of the present invention in which formatting of the E-VLAN tag is performed at u-PE device 23. The top portion of FIG. 3 shows a data traffic path connecting CE device 15 to feature server 31, which path passes through DSLAM 18, u-PE device 23, Ethernet access network 12, and n-PE device 28. Data packet format diagrams are shown under each corresponding network connection.

In the example of FIG. 3, a customer frame provided by CE device 15 is received at an input port DSLAM 18 in a data packet format which includes a customer MAC header, a Layer 2 protocol data unit (L2PDU) payload, and a customer Frame Check Sum (FCS). A processor of DSLAM 18 operates on the customer frame by adding an IEEE 802.1q VLAN tag to the customer frame. This 12-bit VLAN tag identifies the customer or subscriber (i.e., line-id) of the associated frame. DSLAM 18 then forwards the customer frame with the 802.1q VLAN tag to u-PE device 23.

In the exemplary embodiment of FIG. 3, u-PE device 23 performs several operations on the received frame. First, u-PE device 23 encapsulates the entire subscriber frame inside the provider's E-VLAN frame format. In the event that the subscriber frame/packet has customer MAC addresses (as shown in FIG. 3), these MAC addresses are encapsulated without modification. The service provider's source MAC address represents the MAC address of DSLAM 18—e.g., the MAC address of the switch port connected to DSLAM 18—and the service provider's destination MAC address represents the MAC address of the destination feature server, i.e., service node 31. (In certain implementations the provider's source MAC address may represent the edge switch itself.) In other words, all of the customer MAC addresses connected to u-PE device 23 through DSLAM 18 get summarized into a single provider MAC address. Thus, the provider's MAC addresses uniquely identify a DSLAM/feature server pair for traffic through network 12.

In addition, the 12-bit VLAN tag used to identify the subscriber is mapped by u-PE device 23 into the E-VLAN tag, which, in this example, is a 20-bit field. (It is appreciated that other embodiments may utilize a field format that is greater than 20-bits, or less than 20-bits and greater than 12-bits.) The 20-bit E-VLAN tag field, which allows for the unique identification of up to one million DSLAM customers, functions as a service instance identifier for traffic traversing network 12.

Optionally, another 12-bit VLAN tag (outer) may also be added to the frame/packet to represent the broadcast domain of the provider network, which may be either per service type or per feature server and/or DSLAM if finer granularity is needed. In the example, the outer VLAN tag shown in FIG. 3 represents the service type. Note that if the outer VLAN tag is per DSLAM, the total number of DSLAMs supported in the network is constrained by the outer VLAN space (e.g., 4K for 12 bits, or 1M for 20 bits). This constraint may be alleviated in an alternative embodiment, wherein extended VLAN frame formatting is performed in the DSLAM rather than in the u-PE device (as discussed in more detail below).

Figure 4:
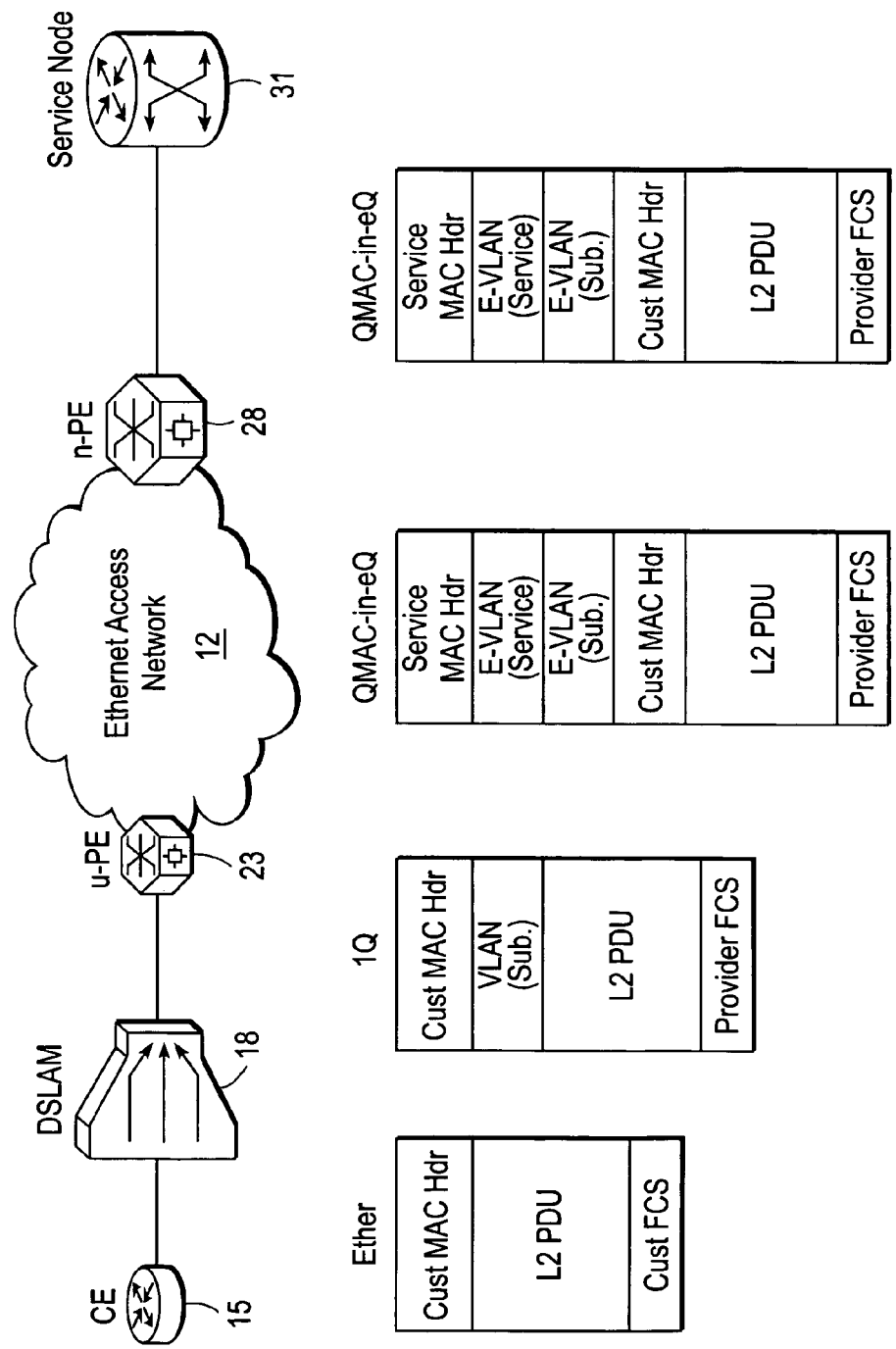
FIG. 4 illustrates the use of the extended VLAN mechanism for forwarding traffic over and Ethernet network in accordance with another embodiment of the present invention.

Instead of adding a 12-bit outer VLAN tag to the frame/packet, u-PE device 23 may add an expanded outer VLAN tag (i.e., E-VLAN of 14 bits or more) to the frame/packet for the purpose of providing much greater capacity. Such an embodiment is shown in FIG. 4, wherein the outer E-VLAN represents the broadcast domain of the provider network, which may be either per service type or per feature server and/or DSLAM. In the case where the outer E-VLAN is a 20-bit field, up to one million service types (or feature servers and/or DSLAMs) may be supported for data traffic through the SP network. At the same time, inner E-VLAN provides identification of up to one million subscribers (assuming a 20-bit field, as shown in FIG. 2).

To summarize, the embodiment of FIG. 3 utilizes an outer VLAN tag per service type, an outer MAC destination address per service node, and an outer MAC source address per u-PE port (DSLAM). Data traffic is forwarded to the destination based on the outer tag and the provider's MAC destination address, with the outer tag narrowing the broadcast domain for a given service type and the destination MAC address selecting a feature server for that service type (in the case of multiple feature servers per service type). Finally, E-VLAN frame decapsulation is performed by the feature servers for proper identification of subscribers by the feature servers.

Practitioners in the networking arts will further understand that for data traffic in the reverse direction, i.e., from a feature server to a given DSLAM, the E-VLAN frame formatting operations described above (including encapsulation) are performed by service node 31 or at n-PE device 28. Decapsulation in the reverse direction may be performed by the u-PE device or destination DSLAM.

In still another alternative embodiment, E-VLAN frame formatting may be performed entirely at the DSLAM device. In one such implementation, the processing unit of the DSLAM maps the subscriber line-id (or the subscriber line-id and the ATM VC) to the service instance identifier of the E-VLAN tag. The DSLAM may also encapsulate the entire subscriber Ethernet frame inside the provider's frame format (i.e., it may add a 12-bit outer VLAN tag or a 20-bit outer E-VLAN tag). As before, the provider's source MAC address represents the MAC address of the DSLAM, and the provider's destination MAC address represents the MAC address of the destination feature server.

In yet another embodiment, QMAC-in-Q encapsulation may be performed by the DSLAM device with a single E-VLAN tag identifying the subscriber (i.e., without any outer tag). Another possibility is to have the u-PE device perform the QMAC-in-Q encapsulation rather than the DSLAM device, with a single E-VLAN tag still identifying the subscriber (i.e., without any outer tag).

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

I claim:

1. A processor-implemented method of operation for a user-facing provider edge (u-PE) device of an Ethernet access network, the method comprising:
   receiving a customer frame from a Digital Subscriber Line Access Multiplexer (DSLAM) device, the customer frame being of a first format that includes a first Virtual Local Area Network (VLAN) tag, the first VLAN tag including a VLAN identifier portion having a first predetermined bit length identifying a Digital Subscriber Line (DSL) subscriber; and
   re-formatting the customer frame into a second format, wherein the first VLAN identifier portion is mapped to a second VLAN identifier portion of a second VLAN tag, the second VLAN identifier portion having a second predetermined bit length greater than the first predetermined bit length, the second VLAN tag identifying a service instance of the Ethernet access network, in the second format the customer frame being encapsulated inside a provider frame, wherein a provider source Media Access Control (MAC) address represents a MAC address associated with the DSLAM, and a provider destination MAC address represents a MAC address of a destination device.

2. The processor-implemented method of claim 1 wherein the destination device is a feature server.

3. The processor-implemented method of claim 1 wherein reformatting the customer frame includes adding a third VLAN tag that specifies a broadcast domain of the Ethernet access network.

4. The processor-implemented method of claim 3 wherein the broadcast domain corresponds to a DSL service type.

5. The processor-implemented method of claim 3 wherein the broadcast domain corresponds to a service node.

6. A processor-implemented method of operation for a Digital Subscriber Line Access Multiplexer (DSLAM) device coupled to an Ethernet access network, comprising:
   encapsulating a customer frame inside a provider frame, wherein a provider source Media Access Control (MAC) address represents a MAC address associated with the DSLAM device, and a provider destination MAC address represents a MAC address of a service node; and
   adding a first Virtual Local Area Network (VLAN) tag having a VLAN identifier bit field that identifies a service instance of the Ethernet access network and other bit fields not identifying the service instance of the Ethernet access network, the VLAN identifier bit field being 20 bits long.

7. The processor-implemented method of claim 6 further comprising:
   adding a second VLAN tag that specifies a broadcast domain of the Ethernet access network.

8. The processor-implemented method of claim 7 wherein the broadcast domain corresponds to a Digital Subscriber Line (DSL) network service type.

9. A user-facing provider edge (u-PE) device for association with an Ethernet access network, the u-PE device comprising:
   a port to receive a customer frame from a Digital Subscriber Line Access Multiplexer (DSLAM) device, the customer frame being of a first format that includes a first Virtual Local Area Network (VLAN) tag including a first VLAN identifying portion of a first predetermined bit length identifying a Digital Subscriber Line (DSL) subscriber; and
   a processor operable to re-format the customer frame into a second format, wherein the VLAN identifying portion of the first VLAN tag is mapped to a VLAN identifying portion of a second VLAN tag, the second VLAN identifying portion having a second predetermined bit length greater than the first predetermined bit length and identifying a service instance of the Ethernet access network, in the second format the customer frame being encapsulated inside a provider frame, wherein a provider source Media Access Control (MAC) address represents a MAC address associated with the DSLAM, and a provider destination MAC address represents a MAC address of a destination device.

10. The u-PE device of claim 9 wherein the second format includes a third VLAN tag that specifies a broadcast domain of the Ethernet access network.

11. The u-PE device of claim 10 wherein the broadcast domain corresponds to a DSL service type.

12. A Digital Subscriber Line Access Multiplexer (DSLAM) device for connection to an Ethernet access network, comprising:
   a port to receive a, customer frame; and
   a processor operable to encapsulate the customer frame inside a provider frame, wherein a provider source Media Access Control (MAC) address represents a MAC address associated with the DSLAM device, and a provider destination MAC address represents a MAC address of a service node, the processor being further operable to add a first Virtual Local Area Network (VLAN) tag having a first VLAN identifier portion that identifies a service instance of the Ethernet access network, the processor being further operable to add a second VLAN tag having a second VLAN identifier portion that specifies a broadcast domain of the Ethernet access network.

13. The DSLAM device of claim 12 wherein the broadcast domain corresponds to a Digital Subscriber Line (DSL) service type.

14. A device for connection to an Ethernet access network, comprising:
   a port to receive a customer frame; and
   a processor operable to encapsulate the customer frame inside a provider frame, wherein a provider source Media Access Control (MAC) address represents a MAC address associated with a Digital Subscriber Line Access Multiplexer (DSLAM) device, and a provider destination MAC address represents a MAC address of a service node, the processor being further operable to add a Virtual Local Area Network (VLAN) tag having a VLAN identifier portion that identifies a service instance of the Ethernet access network and also having other portions that do not identify a service instance of the Ethernet access network, the VLAN identifier portion being greater than 12 bits long.

15. An Ethernet access network, comprising:
a user-facing provider edge (u-PE) device configured to receive a customer frame from a Digital Subscriber Line Access Multiplexer (DSLAM) device, the customer frame including a first Virtual Local Area Network (VLAN) tag that includes a first VLAN identifier portion that identifies a Digital Subscriber Line (DSL) subscriber and that also includes other portions that do not identify the DSL subscriber, the u-PE device including means for encapsulating the customer frame inside a provider frame, wherein a provider source Media Access Control (MAC) address represents a MAC address associated with a Digital Subscriber Line Access Multiplexer (DSLAM) device, and a provider destination MAC address represents a MAC address of a service node, the means also for adding a second VLAN tag having a second VLAN identifier portion that identifies a service instance of the Ethernet access network, the second VLAN tag also including other portions that do not identify a service instance of the Ethernet access network, the second VLAN identifier portion being 20 bits long; and
a network-facing provider edge (u-PE) device configured to forward the packet to the service node.

* * * * *